United States Patent
Qian

(10) Patent No.: US 10,144,852 B2
(45) Date of Patent: Dec. 4, 2018

(54) TRANSPARENT SOLID GLUE AND MANUFACTURING METHOD THEREOF

(71) Applicant: NINGBO PASCO UNITED INDUSTRY CO., LTD, Yuyao (CN)

(72) Inventor: Xiaohua Qian, Yuyao (CN)

(73) Assignee: Ningbo Pasco United Industry Co., Ltd., Yuyao (CN)

( * ) Notice: Subject to any disclaimer, the term of this patent is extended or adjusted under 35 U.S.C. 154(b) by 86 days.

(21) Appl. No.: 15/265,370

(22) Filed: Sep. 14, 2016

(65) Prior Publication Data

US 2017/0355884 A1 Dec. 14, 2017

(30) Foreign Application Priority Data

Jun. 14, 2016 (CN) .......................... 2016 1 0412219

(51) Int. Cl.
| | |
|---|---|
| *C09J 139/06* | (2006.01) |
| *C09J 11/06* | (2006.01) |
| *C08J 3/215* | (2006.01) |
| *C09J 9/00* | (2006.01) |
| *C09J 4/00* | (2006.01) |

(52) U.S. Cl.
CPC ............... *C09J 11/06* (2013.01); *C08J 3/215* (2013.01); *C09J 4/00* (2013.01); *C09J 9/00* (2013.01); *C09J 9/005* (2013.01); *C09J 139/06* (2013.01); *C08J 2339/06* (2013.01)

(58) Field of Classification Search
CPC ....... C09J 4/00; C09J 9/00; C09J 9/005; C09J 11/06; C09J 139/06
See application file for complete search history.

(56) References Cited

U.S. PATENT DOCUMENTS

2006/0193900 A1* 8/2006 Yasukochi ............. C09J 139/06
424/448

* cited by examiner

*Primary Examiner* — Edward J Cain
(74) *Attorney, Agent, or Firm* — Wang Law Firm, Inc.

(57) ABSTRACT

A transparent solid glue, in mass percentage comprises: 10.0%-50.0% of glycerol, 5.0%-20.0% of propylene glycol, 5.0%-30.0% of sticky substance, 1.0%-10.0% of stearic acid, 0-5.0% of vegetable oil, 0.5%-5.0% of protopine, 0.1%-5.0 of excipient, 0.1%-0.5% of preservative, and 5.0%-70.0% of deionized water, wherein the excipient is $C_{12-16}$ saturated or unsaturated fatty acid salt. The prepared transparent solid glue has high initial viscosity; and the drying time is controllable so that the gluing position of the objects to be glued can be adjusted according to actual requirements, which is convenient to use, and the glue exhibits strong adhesion after completely drying. Meanwhile, the addition of protopine causes the pH of the solid glue to be between 10.49-10.99, and accordingly the solid glue is an environmentally friendly solid glue. Within a temperature range from −5° C. to 40° C., this solid glue is widely applicable to gluing paper, wood pieces, photographic paper, paperboards and etc.

6 Claims, No Drawings

TRANSPARENT SOLID GLUE AND MANUFACTURING METHOD THEREOF

RELATE APPLICATIONS

This application claims benefit to Chinese Patent Applications 201610412219.1, filed on Jun. 14, 2016. The specifications of both applications are incorporated here by this reference.

Field of the Invention

The present invention relates to the field of adhesives and in particular to a transparent solid glue and a preparation method thereof.

Description of the Prior Art

Adhesives, as a kind of substance bonding surfaces of homogeneous or heterogeneous objects together, include solid glue and liquid glue when classified in terms of form. Wherein, liquid glue usually uses starch, animal and vegetable fats, or synthetic material having certain viscosity as raw material, and has problems such as inconvenient to carry and long time required for drying and bonding. Solid glue is a solid adhesive made by using animal glue, anticoagulants, fatty acid salts, solvents, preservatives and the like as main raw material, and has the advantages of long shelf life, convenient to carry, convenient to use, firm gluing and the like. At present, the commercially available solid glue is usually made by directly heating to dissolve starch or sticky substance and then adding protopine and higher fatty acids to result in saponification, for example, the Chinese Invention Patent No. 201310436284.4 (Publication No.: CN 103497702 A) titled "Preparation Method of Solid Adhesives".

The existing solid glue is usually strongly alkaline (pH=11) and thus has a short shelf life. Furthermore, as the shelf life increases, the viscosity decreases; and problems such as thinning and yellowing occur. In addition, the glue dries quickly after applied, and it is thus unable to adjust the position of the objects to be glued according to actual requirements. And, after the glue dries, the brittleness increases and the bonding capacity decreases.

SUMMARY OF THE INVENTION

A first technical problem to be solved in the present invention is to, in view of the problems in the prior art, provide a transparent, drying-time controllable and environmentally friendly solid glue.

A second technical problem to be solved in the present invention is to, in view of the problems in the prior art, provide a method of making the transparent solid glue.

To solve the first technical problem, the transparent solid glue, in mass percentage comprises:
glycerol 10.0%-50.0%,
propylene glycol 5.0%-20.0%,
sticky substance 5.0%-30.0%,
stearic acid 1.0%-10.0%,
vegetable oil 0-5.0%,
protopine 0.5%-5.0%,
excipient 0.1%-5.0%,
preservative 0.1%-0.5%, and
deionized water 5.0%-70.0%,
wherein the excipient is $C_{12-16}$ saturated or unsaturated fatty acid salt.

In this solution, the sticky substance is dissolved in a mixed solution composed of glycerol, water and propylene glycol, so that the solid glue has certain initial adhesion when bonding objects initially. Since glycerol, water, propylene glycol and vegetable oil have different volatile points, the complete drying time of the solid glue after applied onto the objects to be glued can be controlled by adjusting the ratio of glycerol, water, propylene glycol and vegetable oil in the solid glue, and further, the gluing position of the objects to be glued can be adjusted according to actual requirements. Of course, this technical effect can be realized by the interaction among glycol, water and propylene glycol only, without vegetable oil. However, the addition of vegetable oil can better control the complete drying time. In addition, the existing solid glue usually uses sodium stearate resulted from the reaction of stearic acid and protopine as an excipient, wherein, stearic acid, also referred to as octadecanoic acid, is white fine powdery or blocky, and thus the prepared solid glue is usually a white solid in the cooled state. In addition, the addition of stearic acid can improve the hardness of the glue body. However, too much stearic acid will decrease the plasticity of the glue body. Accordingly, in the present invention, $C_{12-16}$ saturated or unsaturated fatty acid salt are used as the novel excipients, and are brought to interact with the sodium stearate resulted from the reaction of stearic acid and protopine. In this way, the solid glue of the present invention has both good formability and excellent transparency.

Preferably, the excipient in the present invention is at least one of sodium laurate, sodium myrastate or sodium oleate. Of course, the excipient can be other common laureates, myrastates and oleates, for example, potassium laurate. In the present invention, the excipient is preferably sodium laurate. Since the sodium laurate solution is substantially clear below a concentration of 25 mg/ml, the interaction of the sodium laurate and the sodium stearate can well realize the transparency of the solid glue. Furthermore, too less sodium laurate will cause the glue body turbid and not transparent enough, while too much sodium laurate will cause the glue body slightly soft.

In this solution, the added vegetable oil can interact with the glycerol, water and propylene glycol, and also further facilitate the control on the complete drying time. Furthermore, the vegetable oil can result in saponification with the protopine to further improve the transparency of the solid glue. Preferably, the vegetable oil in the present invention can be at least one of castor oil, palm-kernel oil, coconut oil, or corn oil, and preferably, the vegetable oil is castor oil.

Preferably, the sticky substance is polyvinylpyrrolidone (PVP).

Preferably, the preservative is B20. Of course, the preservative can be methylparaben or ethylparaben preservatives. From the standpoint of ensuring excellent preservative effects, B20 conforms more to the U.S. regulations and is beneficial for the international marketing of the solid glue product.

To solve the second technical problem, the method of making the transparent solid glue comprises the following steps:

(1) adding a prescribed amount of deionized water in accordance with the prescribed ratio into a reaction vessel, then adding glycerol and propylene glycol in accordance with the prescribed ratio while stirring, and mixing until even;

(2) adding sticky substance to the reaction vessel while stirring, stirring for 60-90 min, and soaking for a period of time until the sticky substance is completely dissolved to form a mixed solution in the reaction vessel;

(3) feeding steam into the mixed solution while stirring until the temperature of the mixed solution rises to 60-80° C., adding vegetable oil and stearic acid while stirring, stirring for 5-10 min to generate higher fatty acids, then adding pre-prepared protopine solution, and stirring until even;

(4) continuing heating so that the temperature of the mixed solution rises to 80-90° C., and continuing heating for 30-35 min;

(5) adding the excipient into the mixed solution at 80-90° C., stirring until even, and continuing heating for 10-15 min;

(6) keeping the temperature of the mixed solution at 80-90° C., adding the preservative, and stirring for 8-12 min; and (7) keeping the temperature of the mixed solution at 80-90° C., keeping still for 8-10 hr to defoam until the mixed solution becomes a bubble-free semi-transparent liquid, and then discharging the liquid to fill packaging.

Compared with the prior art, the present invention has the following advantages:

Since glycerol, water, propylene glycol and vegetable oil have different volatile points, the complete drying time of the solid glue after applied onto the objects to be glued can be controlled by adjusting the ratio of glycerol, water, propylene glycol and vegetable oil in the solid glue, and further, the gluing position of the objects to be glued can be adjusted according to actual requirements.

In addition, $C_{12-16}$ saturated or unsaturated fatty acid salt are used as the novel excipients, and are brought to interact with the sodium stearate resulted from the reaction of stearic acid and protopine. In this way, the solid glue of the present invention has both good formability and excellent transparency above 85%.

The method of the transparent solid glue of the present invention is very simple; the prepared transparent solid glue has high initial viscosity; the glue body is transparent and beautiful; and the drying time is controllable so that the gluing position of the objects to be glued can be adjusted according to actual requirements, which is convenient to use, and the glue exhibits strong adhesion after completely dried.

Meanwhile, the addition of protopine causes the pH of the solid glue to be between 10.49-10.99, and accordingly the solid glue is an environmentally friendly solid glue. Within a temperature range from −5° C. to 40° C., this solid glue is widely applicable to gluing paper, wood pieces, photographic paper, paperboards and etc.

DETAILED DESCRIPTION OF THE PREFERRED EMBODIMENT

To enable a further understanding of the innovative and technological content of the invention herein refer to the detailed description of the invention and the accompanying embodiments below:

Embodiment 1

In this embodiment, a transparent solid glue in mass percentage comprises: 10.0% of glycerol, 5.0% of propylene glycol, 5.0% of PVP (purchased from U.S. ISP, similarly hereinafter), 10.0% of stearic acid, 5.0% of protopine, 5.0% of sodium laurate (purchased from Shanghai Sinopharm, similarly hereinafter), 0.5% of preservative (B20, purchased from Thor Specialty Chemical (Shanghai) Co., Ltd., similarly hereinafter), and 59.5% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 60 min, and soaking for a period of time until the PVP is completely dissolved to form a mixed solution in the reaction vessel;

(3) feeding steam into the mixed solution while stirring until the temperature of the mixed solution rises to 80° C., adding stearic acid while stirring, stirring for 5 min to generate higher fatty acids, then adding pre-prepared protopine solution, and stirring until even;

(4) continuing heating so that the temperature of the mixed solution rises to 80° C., and continuing heating for 30 min;

(5) adding the sodium laurate into the mixed solution at 80° C., stirring until even, and continuing heating for 10 min;

(6) keeping the temperature of the mixed solution at 90° C., adding the preservative, and stirring for 8 min; and (7) keeping the temperature of the mixed solution at 80° C., keeping still for 10 hr to defoam until the mixed solution becomes a bubble-free semi-transparent liquid, and then discharging the liquid to fill packaging.

Embodiment 2

In this embodiment, a transparent solid glue in mass percentage comprises: 50.0% of glycerol, 20.0% of propylene glycol, 5.0% of PVP, 1.0% of stearic acid, 0.1% of castor oil, 4.0% of protopine, 0.1% of sodium laurate, 0.5% of preservative (B20), and 19.3% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 90 min, and soaking for a period of time until the PVP is completely dissolved to form a mixed solution in the reaction vessel;

(3) feeding steam into the mixed solution while stirring until the temperature of the mixed solution rises to 60° C., adding castor oil and stearic acid while stirring, stirring for 10 min to generate higher fatty acids, then adding pre-prepared protopine solution, and stirring until even;

(4) continuing heating so that the temperature of the mixed solution rises to 90° C., and continuing heating for 35 min;

(5) adding the excipient into the mixed solution at 90° C., stirring until even, and continuing heating for 15 min;

(6) keeping the temperature of the mixed solution at 80° C., adding the preservative, and stirring for 12 min; and (7) keeping the temperature of the mixed solution at 90° C., keeping still for 8 hr to defoam until the mixed solution becomes a bubble-free semi-transparent liquid, and then discharging the liquid to fill packaging.

Embodiment 3

In this embodiment, a transparent solid glue in mass percentage comprises: 20.0% of glycerol, 10.0% of propylene glycol, 10.0% of PVP, 2.0% of stearic acid, 0.5% of castor oil, 1.0% of protopine, 0.5% of sodium laurate, 0.1% of preservative (B20), and 55.9% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 65 min, and soaking for a period of time until the PVP is completely dissolved to form a mixed solution in the reaction vessel;

(3) feeding steam into the mixed solution while stirring until the temperature of the mixed solution rises to 65° C., adding castor oil and stearic acid while stirring, stirring for 7 min to generate higher fatty acids, then adding pre-prepared protopine solution, and stirring until even;

(4) continuing heating so that the temperature of the mixed solution rises to 85° C., and continuing heating for 32 min;

(5) adding the sodium laurate into the mixed solution at 85° C., stirring until even, and continuing heating for 12 min;

(6) keeping the temperature of the mixed solution at 85° C., adding the preservative, and stirring for 10 min; and (7) keeping the temperature of the mixed solution at 85° C., keeping still for 8.5 hr to defoam until the mixed solution becomes a bubble-free semi-transparent liquid, and then discharging the liquid to fill packaging.

Embodiment 4

In this embodiment, a transparent solid glue in mass percentage comprises: 10.0% of glycerol, 5.0% of propylene glycol, 5.0% of PVP, 5.8% of stearic acid, 1.0% of castor oil, 2.0% of protopine, 1.0% of sodium laurate, 0.2% of preservative (B20), and 70% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 70 min, and soaking for a period of time until the PVP is completely dissolved to form a mixed solution in the reaction vessel;

(3) feeding steam into the mixed solution while stirring until the temperature of the mixed solution rises to 70° C., adding castor oil and stearic acid while stirring, stirring for 7 min to generate higher fatty acids, then adding pre-prepared protopine solution, and stirring until even;

(4) continuing heating so that the temperature of the mixed solution rises to 87° C., and continuing heating for 34 min;

(5) adding the sodium laurate into the mixed solution at 87° C., stirring until even, and continuing heating for 13 min;

(6) keeping the temperature of the mixed solution at 87° C., adding the preservative, and stirring for 11 min; and (7) keeping the temperature of the mixed solution at 87° C., keeping still for 9.5 hr to defoam until the mixed solution becomes a bubble-free semi-transparent liquid, and then discharging the liquid to fill packaging.

Embodiment 5

In this embodiment, a transparent solid glue in mass percentage comprises: 50.0% of glycerol, 20.0% of propylene glycol, 12.7% of PVP, 5.0% of stearic acid, 2.0% of castor oil, 3.0% of protopine, 2.0% of sodium laurate, 0.3% of preservative (B20), and 5.0% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 90 min, and soaking for a period of time until the PVP is completely dissolved to form a mixed solution in the reaction vessel;

(3) feeding steam into the mixed solution while stirring until the temperature of the mixed solution rises to 70° C., adding castor oil and stearic acid while stirring, stirring for 10 min to generate higher fatty acids, then adding pre-prepared protopine solution, and stirring until even;

(4) continuing heating so that the temperature of the mixed solution rises to 90° C., and continuing heating for 35 min;

(5) adding the sodium laurate into the mixed solution at 85° C., stirring until even, and continuing heating for 12 min;

(6) keeping the temperature of the mixed solution at 80° C., adding the preservative, and stirring for 12 min; and (7) keeping the temperature of the mixed solution at 85° C., keeping still for 9 hr to defoam until the mixed solution becomes a bubble-free semi-transparent liquid, and then discharging the liquid to fill packaging.

Embodiment 6

In this embodiment, a transparent solid glue in mass percentage comprises: 30.0% of glycerol, 15.0% of propylene glycol, 20.0% of PVP, 6.0% of stearic acid, 3.0% of castor oil, 0.5% of protopine, 3.0% of sodium laurate, 0.1% of preservative (B20), and 22.4% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 80 min, and soaking for a period of time until the PVP is completely dissolved to form a mixed solution in the reaction vessel;

(3) feeding steam into the mixed solution while stirring until the temperature of the mixed solution rises to 70° C., adding stearic acid and castor oil while stirring, stirring for 8 min to generate higher fatty acids, then adding pre-prepared protopine solution, and stirring until even;

(4) continuing heating so that the temperature of the mixed solution rises to 85° C., and continuing heating for 35 min;

(5) adding the sodium laurate into the mixed solution at 85° C., stirring until even, and continuing heating for 15 min;

(6) keeping the temperature of the mixed solution at 90° C., adding the preservative, and stirring for 12 min; and (7) keeping the temperature of the mixed solution at 90° C., keeping still for 9 hr to defoam until the mixed solution becomes a bubble-free semi-transparent liquid, and then discharging the liquid to fill packaging.

Embodiment 7

Differing from Embodiment 3, In this embodiment, a transparent solid glue in mass percentage comprises: 40.0% of glycerol, 5.0% of propylene glycol, 25.0% of PVP, 5.0% of stearic acid, 4.0% of castor oil, 4.0% of protopine, 4.0% of sodium laurate, 0.4% of preservative (B20), and 12.6% of deionized water.

Embodiment 8

In this embodiment, a transparent solid glue in mass percentage comprises: 20.0% of glycerol, 10.0% of propylene glycol, 10.0% of PVP, 7.0% of stearic acid, 5.0% of palm-kernel oil, 5.0% of protopine, 2.0% of sodium laurate, 0.4% of preservative (B20), and 40.6% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 90 min, and soaking for a period of time until the PVP is completely dissolved to form a mixed solution in the reaction vessel;

(3) feeding steam into the mixed solution while stirring until the temperature of the mixed solution rises to 60° C., adding palm-kernel oil and stearic acid while stirring, stirring for 10 min to generate higher fatty acids, then adding pre-prepared protopine solution, and stirring until even;

(4) continuing heating so that the temperature of the mixed solution rises to 90° C., and continuing heating for 35 min;

(5) adding the sodium laurate into the mixed solution at 90° C., stirring until even, and continuing heating for 15 min;

(6) keeping the temperature of the mixed solution at 80° C., adding the preservative, and stirring for 12 min; and (7) keeping the temperature of the mixed solution at 90° C., keeping still for 8 hr to defoam until the mixed solution becomes a bubble-free semi-transparent liquid, and then discharging the liquid to fill packaging.

Embodiment 9

In this embodiment, a transparent solid glue in mass percentage comprises: 40.0% of glycerol, 15.0% of propylene glycol, 15.0% of PVP, 5.0% of stearic acid, 3.0% of castor oil, 2.0% of protopine, 3.0% of sodium myrastate (purchased from Shanghai Sinopharm), 0.4% of preservative (B20), and 16.6% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 90 min, and soaking for a period of time until the PVP is completely dissolved to form a mixed solution in the reaction vessel;

(3) feeding steam into the mixed solution while stirring until the temperature of the mixed solution rises to 70° C., adding castor oil and stearic acid while stirring, stirring for 10 min to generate higher fatty acids, then adding pre-prepared protopine solution, and stirring until even;

(4) continuing heating so that the temperature of the mixed solution rises to 90° C., and continuing heating for 35 min;

(5) adding the sodium myrastate into the mixed solution at 85° C., stirring until even, and continuing heating for 12 min;

(6) keeping the temperature of the mixed solution at 80° C., adding the preservative, and stirring for 12 min; and (7) keeping the temperature of the mixed solution at 85° C., keeping still for 9 hr to defoam until the mixed solution becomes a bubble-free semi-transparent liquid, and then discharging the liquid to fill packaging.

Embodiment 10

In this embodiment, a transparent solid glue in mass percentage comprises: 20.0% of glycerol, 10.0% of propylene glycol, 10.0% of PVP, 8.0% of stearic acid, 5.0% of castor oil, 3.0% of protopine, 4.0% of sodium oleate, 0.5% of preservative (B20), and 39.5% of deionized water.

A method of making the transparent solid glue of this embodiment, comprises:

(1) adding a prescribed amount of deionized water in accordance with the prescribed ratio into a reaction vessel, then adding glycerol and propylene glycol in accordance with the prescribed ratio while stirring, and mixing until even;

(2) adding PVP to the reaction vessel while stirring, stirring for 75 min, and soaking for a period of time until the PVP is completely dissolved to form a mixed solution in the reaction vessel;

(3) feeding steam into the mixed solution while stirring until the temperature of the mixed solution rises to 75° C., adding castor oil and stearic acid while stirring, stirring for 10 min to generate higher fatty acids, then adding pre-prepared protopine solution, and stirring until even;

(4) continuing heating so that the temperature of the mixed solution rises to 80° C., and continuing heating for 35 min;

(5) adding the sodium oleate into the mixed solution at 85° C., stirring until even, and continuing heating for 12 min;

(6) keeping the temperature of the mixed solution at 80° C., adding the preservative, and stirring for 12 min; and (7) keeping the temperature of the mixed solution at 85° C., keeping still for 9 hr to defoam until the mixed solution becomes a bubble-free semi-transparent liquid, and then discharging the liquid to fill packaging.

The solid glues prepared in the foregoing Embodiments 1-10 all conform to the Chinese standard QB/T2857-2007, with solid content: up to 45-60%; pH=10.49-10.99; strength: usually, 60-80 MPA (24 h) for A4 paper, 90-110 MPA for paperboards, and 120-150 MPA for photographic (HP) paper; and applicable ambient temperature: −5-40° C.

Transparency Tests

Method: cutting the solid glue into slices (1 mm thick), and measuring the light transmittance of the slices by a spectrophotometer at different wavelengths of (respectively: 450 nm, 750 nm, 980 nm) of incident light.

Results: the light transmittance of all the solid glues prepared in the Embodiments 1-10 is above 85%, and the light transmittance of the solid glues prepared in the Embodiments 1-8 is greater than that of the solid glues prepared in the Embodiment 9 and Embodiment 10.

Complete Drying Time Tests

Method: applying the solid glue onto 80 g A4 paper in a force of 500 g twice at 25° C. and under the humidity of 40-60, and then bonding the two pieces of paper. After a certain period of time, the two pieces of paper are separated. If fiber fracture occurs in the pieces of paper, another test is performed and the waiting time is reduced, and this process is repeated until the shortest time after which fiber fracture occurs is measured. Similarly, if no fiber fracture occurs in the pieces of paper when they are separated after a certain period of time, the waiting time is increased, and this process is repeated until the shortest time at which fiber fracture occurs is measured. Five parallel tests are performed for each solid glue.

Results: for the solid glue prepared in Embodiment 1, the time after which paper breaks is 10-11 min; for the solid glues prepared in Embodiments 3, 4 and 10, the time after which paper breaks is 11-13 min; for the solid glues prepared in Embodiments 6, 7, 8 and 9, the time after which paper breaks is 12-15 min; and for the solid glues prepared in Embodiments 2 and 5, the time after which paper breaks is 6-10 min. Thus, the complete drying time of the solid glue of the present invention is longer than that of the existing commercially available solid glue. Meanwhile, the complete drying time of the solid glue can be adjusted according to actual requirements.

The invention claimed is:

1. A transparent solid glue, in mass percentage comprising:
    glycerol 10.0%-50.0%,
    propylene glycol 5.0%-20.0%,
    sticky substance 5.0%-30.0%,
    stearic acid 1.0%-10.0%,
    vegetable oil 0-5.0%,
    protopine 0.5%-5.0%,
    excipient 0.1%-5.0%,
    preservative 0.1%-0.5%, and
    deionized water 5.0%-70.0%,
    wherein the excipient is $C_{12-16}$ saturated or unsaturated fatty acid salt; and
    wherein the sticky substance is polyvinylpyrrolidone.

2. The transparent solid glue of claim 1, wherein the excipient is at least one of sodium laurate, sodium myrastate, or sodium oleate.

3. The transparent solid glue of claim 2, wherein the excipient is sodium laurate.

4. The transparent solid glue of claim 1, wherein the vegetable oil is at least one of castor oil, palm-kernel oil, coconut oil, or corn oil.

5. The transparent solid glue of claim 4, wherein the vegetable oil is castor oil.

6. A method of making the transparent solid glue of claim 1, the method comprising:
    (1) adding a prescribed amount of deionized water in accordance with the prescribed ratio into a reaction vessel, then adding glycerol and propylene glycol in accordance with the prescribed ratio while stirring, and mixing unfit even;
    (2) adding the sticky substance to the reaction vessel while stirring, stirring for 60-90 minutes, and soaking for a period of time until the sticky substance is completely dissolved to form a mixed solution in the reaction vessel;
    (3) feeding steam into the mixed solution while stirring until the temperature of the mixed solution rises to 60-80° C., adding vegetable oil and stearic acid while stirring, stirring for 5-10 minutes to generate higher fatty acids, then adding pre-prepared protopine solution, and stirring until even;
    (4) continuing heating so that the temperature of the mixed solution rises to 80-90° C., and continuing heating for 30-35 minutes;
    (5) adding the excipient into the mixed solution at 80-90° C., stirring until even, and continuing heating for 10-15 minutes;
    (6) keeping the temperature of the mixed solution at 80-90° C., adding the preservative, and stirring for 8-12 minutes; and
    (7) keeping the temperature of the mixed solution at 80-90° C., keeping still for 8-10 hours to defoam until the mixed solution becomes a bubble-free semi-transparent liquid, and then discharging the liquid to fill packaging.

* * * * *